United States Patent
Liu

(10) Patent No.: US 8,186,993 B2
(45) Date of Patent: May 29, 2012

(54) BLOW MOLD, ESPECIALLY FOR PRODUCING A MANNEQUIN

(76) Inventor: Jinghui Liu, Guangzhou (CN)

( * ) Notice: Subject to any disclaimer, the term of this patent is extended or adjusted under 35 U.S.C. 154(b) by 117 days.

(21) Appl. No.: 12/817,231

(22) Filed: Jun. 17, 2010

(65) Prior Publication Data

US 2010/0255141 A1 Oct. 7, 2010

Related U.S. Application Data

(63) Continuation of application No. PCT/CN2008/002038, filed on Dec. 22, 2008.

(51) Int. Cl.
*B29C 49/20* (2006.01)
*B29C 49/62* (2006.01)

(52) U.S. Cl. ........ 425/503; 425/522

(58) Field of Classification Search ......... 425/503, 425/522
See application file for complete search history.

(56) References Cited

U.S. PATENT DOCUMENTS

| | | | | |
|---|---|---|---|---|
| 2,967,330 A | * | 1/1961 | Tommarchi | 264/540 |
| 4,699,585 A | * | 10/1987 | Giese et al. | 425/522 |
| 6,524,519 B1 | * | 2/2003 | Ohba et al. | 264/534 |
| 7,134,867 B2 | * | 11/2006 | Jarman et al. | 425/525 |

FOREIGN PATENT DOCUMENTS

| | | | |
|---|---|---|---|
| JP | 04347622 A | * | 12/1992 |
| JP | 09070876 A | * | 3/1997 |
| JP | 2000158524 A | * | 6/2000 |
| JP | 2000167918 A | * | 6/2000 |
| JP | 2003117989 A | * | 4/2003 |

OTHER PUBLICATIONS

Derwent abstract of CN 200970890 Y to Liu dated Nov. 7, 2007 and 1 figure.*
Derwent abstract of CN 2908129 Y to Liu dated Jun. 6, 2007 and 1 figure.*
Derwent abstract of CN 200980510 Y to Liu dated Nov. 28, 2007 and 1 figure.*

* cited by examiner

*Primary Examiner* — Robert B Davis
(74) *Attorney, Agent, or Firm* — Matthias Scholl P.C.; Matthias Scholl

(57) ABSTRACT

A blow mold for a mannequin, comprising a model cavity having a profile, an inserting part, and a drive device. The inserting part is disposed on the model cavity, a modeling surface is disposed in the front of the inserting part, and operates to form a part of the profile of the model cavity, an angle between the molding surface of the inserting part and the profile of the model cavity is 90 degrees, a gap is disposed between the model cavity and the inserting part, a protruding portion is disposed on the molding surface of the inserting part and faces towards the inside of the model cavity, the inserting part is connected to the drive device, and the drive device operates to drive the inserting part to move towards the model cavity before blow molding, and to reset the inserting part after blow molding,

16 Claims, 10 Drawing Sheets

BLOW MOLD, ESPECIALLY FOR PRODUCING A MANNEQUIN

CROSS-REFERENCE TO RELATED APPLICATIONS

This application is a continuation of International Patent Application No. PCT/CN2008/002038 with an international filing date of Dec. 22, 2008, designating the United States, now pending, and further claims priority benefits to Chinese Patent Application No. 200720061760.9 filed on Dec. 18, 2007. The contents of all of the aforementioned applications, including any intervening amendments thereto, are incorporated herein by reference.

BACKGROUND OF THE INVENTION

1. Field of the Invention

The invention relates to a blow mold, and more particularly to a blow mold for producing a mannequin.

2. Description of the Related Art

Blow molds are widely used in industrial production and everyday life, and a blow molding process normally comprises forming a parison, and blowing and expanding the parison via compressed air whereby enabling it to be closely attached to a model cavity of a mold.

As shown in FIG. 1, a blow mold for a mannequin in the prior art is shown. A billet 12 is contacted with adjacent surfaces of the model cavity, and remaining air therebetween is pushed to form an air bag, and then a dead corner 11 is formed that the billet 12 cannot reach. Since the billet 12 cannot reach the dead corner 11, an arc-shaped or a spherical transition is formed between adjacent surfaces of a final product. Due to a relatively large air pressure needed in the process, problems may arise, such as too thick of a glue at those places, low strength, and failure of the blow mold, which may cause a concave part 13 to be formed in connection areas of the mannequin (as shown in FIG. 2), adversely affecting the exhibition effect thereof.

In addition, a connecting device is used during assembling of components forming the mannequin. To fix the connecting device, a hole or a cavity is disposed on a surface of a component whereby receiving the connecting device. However, since the hole or the cavity cannot be formed along with the component forming the mannequin, secondary processing thereof is required, which reduces production efficiency and increases production cost.

SUMMARY OF THE INVENTION

In view of the above-described problem, it is one objective of the invention to provide a blow mold for a mannequin that is capable of addressing the above-mentioned problems To achieve the above objectives, in accordance with one embodiment of the invention, provided is a blow mold for a mannequin, comprising a model cavity having a profile, an inserting part, and a drive device. The inserting part is disposed on the model cavity; a modeling surface is disposed in the front of the inserting part, and operates to form a part of the profile of the model cavity,; an angle between the molding surface of the inserting part and the profile of the model cavity is 90 degree;, a gap is disposed between the model cavity and the inserting part; a protruding portion is disposed on the molding surface of the inserting part and faces towards the inside of the model cavity; the inserting part is connected to the drive device; and the drive device operates to drive the inserting part to move towards the model cavity before blow molding, and to reset the inserting part after blow molding.

In a class of this embodiment, the protruding part is disposed on the inserting part.

In a class of this embodiment, the protruding part is fixedly connected to the inserting part.

In a class of this embodiment, the protruding part is flexibly connected to the inserting part.

In a class of this embodiment, the drive device is an air cylinder or a hydraulic cylinder, a body of the drive device is disposed on a mold, and an axis of the drive device is connected to the inserting part.

In a class of this embodiment, a width of the gap is 0.5-2.5 mm.

In a class of this embodiment, a height of the protruding part is 4-30 mm.

In a class of this embodiment, it further comprises a concave part disposed on the inserting part.

In a class of this embodiment, it further comprises a connecting device received in the concave part and connected to a lower limb of the mannequin.

In accordance with another embodiment of the invention, provided is a blow mold for a mannequin, comprising a model cavity having a profile, an inserting part, and a drive device. The inserting part is disposed on the model cavity, a modeling surface is disposed in the front of the inserting part, and operates to form a part of the profile of the model cavity, an angle between the molding surface of the inserting part and the profile of the model cavity is 90 degrees, a gap is disposed between the model cavity and the inserting part, a protruding portion is disposed on the molding surface of the inserting part and faces towards the inside of the model cavity, the protruding part is connected to the drive device, the drive device operates to drive the protruding part to move towards the model cavity before blow molding, and to reset the protruding part after blow molding, a height of the protruding part is less than or equal to a moving distance of the protruding part under the action of the drive device.

In a class of this embodiment, the protruding part is disposed on the inserting part.

In a class of this embodiment, the protruding part is fixedly connected to the inserting part.

In a class of this embodiment, the protruding part is flexibly connected to the inserting part.

In a class of this embodiment, the drive device is an air cylinder or a hydraulic cylinder, a body of the drive device is disposed on a mold, and an axis of the drive device is connected to the protruding part.

In a class of this embodiment, a width of the gap is 0.5-2.5 mm.

In a class of this embodiment, a height of the protruding part is 4-30 mm.

In a class of this embodiment, it further comprises a concave part disposed on the inserting part.

In a class of this embodiment, it further comprises a connecting device received in the concave part and connected to a lower limb of the mannequin.

Advantages of the invention comprise:

1. The invention breaks through bottle neck of production of the blow mold industry, and overcomes a problem with the conventional blow mold process that it cannot product a blow mold having right angle edges connected to each other, has non-arch-shaped transition, and implements assembly tolerance fit between different blow molds.

2. A small arc-shaped transition is formed between adjacent surfaces of the invention, and no concave part is generated, which ensure convenient connection between different components. As the invention is used for producing mannequins, they feature good exhibition effect.

3. The invention solves a problem with the conventional process that the blow mold is easy to be broken and fragmented, and improves quality of the product and increases work life thereof.

4. the blow mold process of the invention reduces harm to workers caused by industrial pollution and improves work environment, and raw materials can be used, which reduces production cost.

5. a cavity is directly disposed on a surface of a component whereby receiving a connecting device, and secondary processing thereof is not required, which increase production capacity.

BRIEF DESCRIPTION OF THE DRAWINGS

Further description of the invention will be given below in conjunction with accompanying drawings and specific embodiments.

DETAILED DESCRIPTION OF THE EMBODIMENTS

Figure 1:
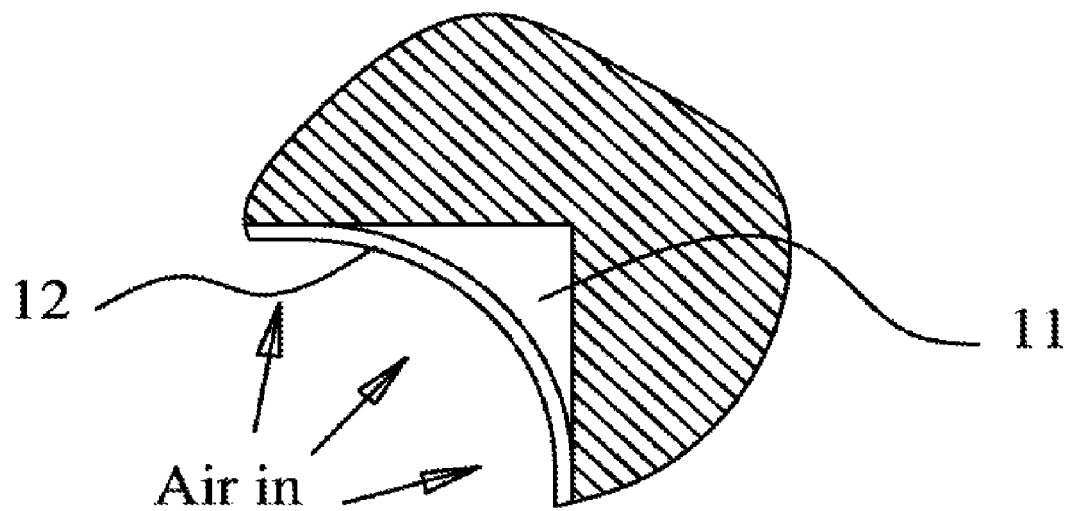
FIG. 1 is a schematic view of a blow mold for a mannequin in the prior art.
Figure 2:
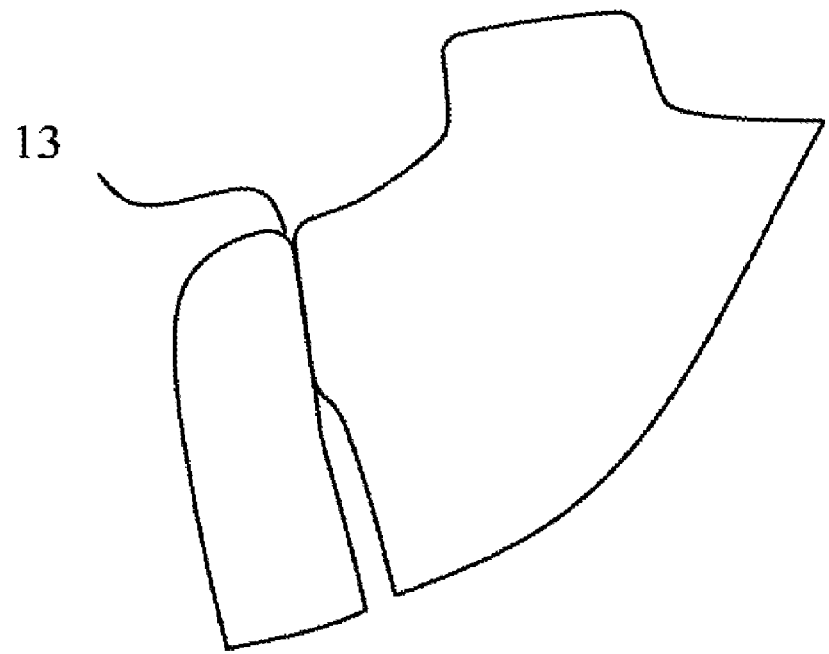
FIG. 2 is a schematic view of a mannequin in the prior art.
Figure 3:
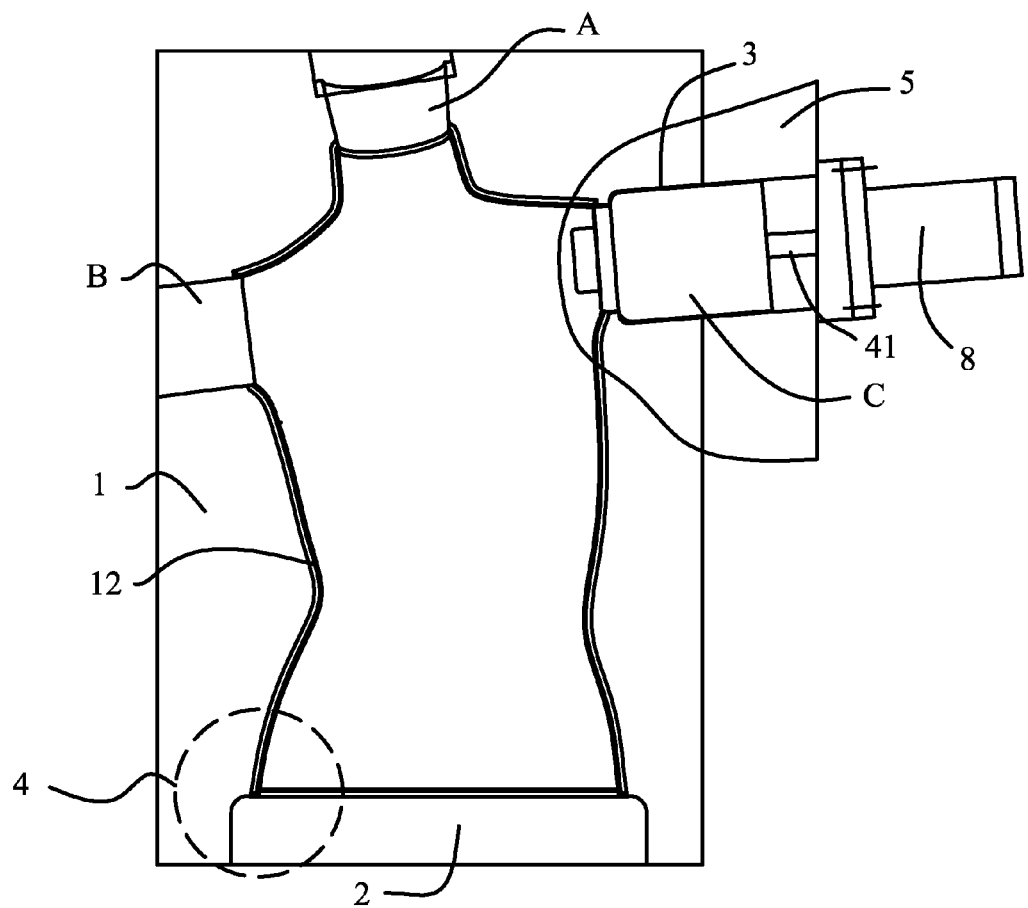
FIG. 3 is a schematic view of a blow mold for a trunk of a mannequin of an exemplary embodiment of the invention.
Figure 4:
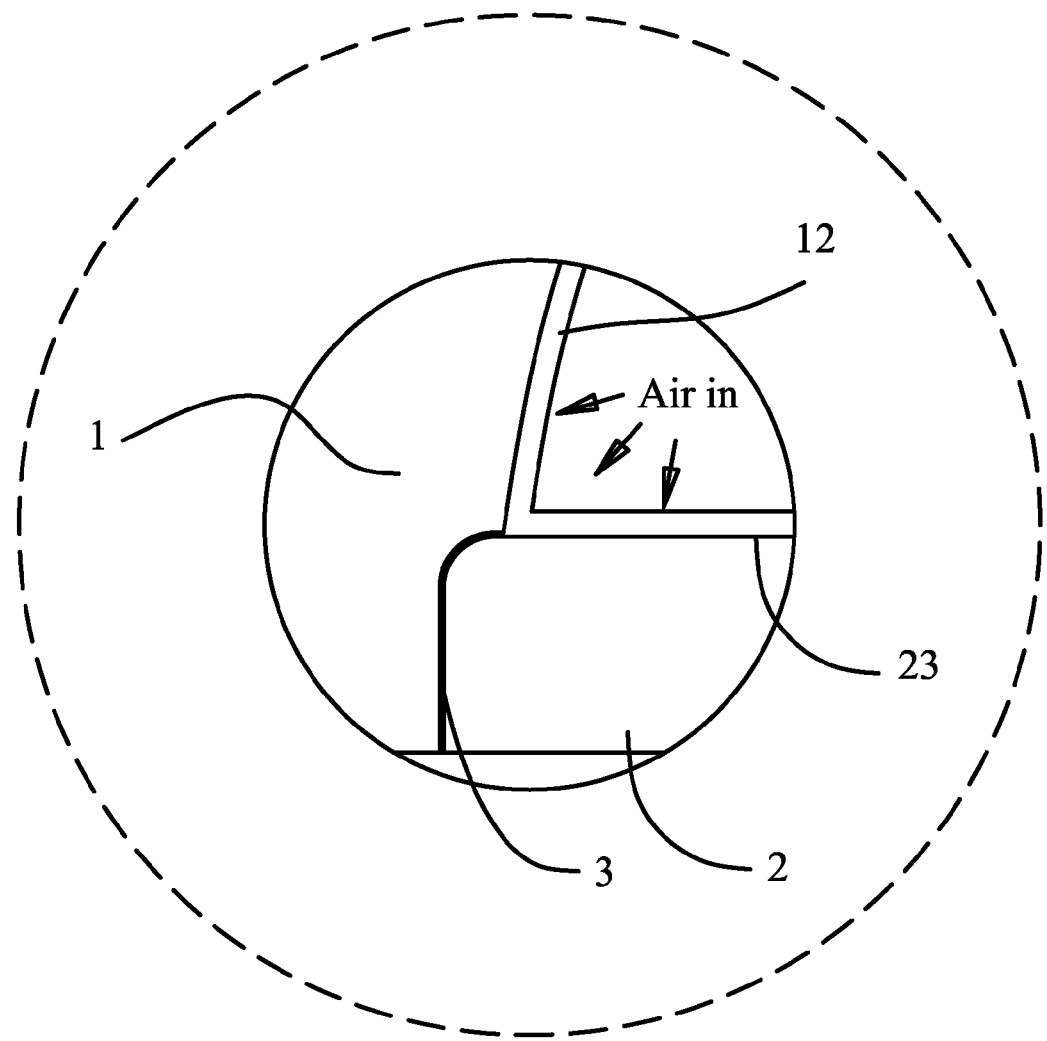
FIG. 4 is a partial enlarged view of a position G in FIG. 3.

As shown in FIGS. 3 and 4, a blow mold for a mannequin of the invention comprises a model cavity 1 having a profile, and multiple inserting part A, B, C and 2.

The inserting parts A, B, C and 2 are disposed on a position of the model cavity 1 that molds a connecting surface, and a modeling surface 23 is disposed in the front of the inserting part 2, and operates to form a part of the profile of the model cavity 1.

An angle between the molding surface 23 of the inserting part and the profile of the model cavity 1 is 90 degrees.

A gap 3 is disposed between the model cavity 1 and the inserting part 2 and operates as a venting slot. A width of the venting slot is dependent on a size of a final product and air pressure, and normally 0.5-2.5 mm. Preferably, a width of the venting slot is 1.5 mm.

As shown in FIG. 4, under the action of air pressure, a billet 12 discharges air in a dead core 11 via the gap 3 whereby enabling the billet 12 to be closely attached to the wall of the model cavity 1, and to the inserting part 2. Meanwhile, small amount of burrs may occur at the venting slot of the final product and be eliminated after a follow-up process, and thus a blow mold product with a non-arc-shaped transition is formed.

Figure 5:
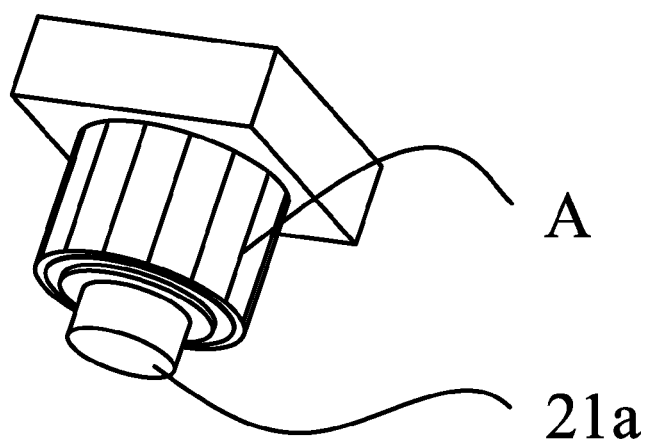
FIG. 5 is a perspective view of an inserting part A in FIG. 3.
Figure 6:
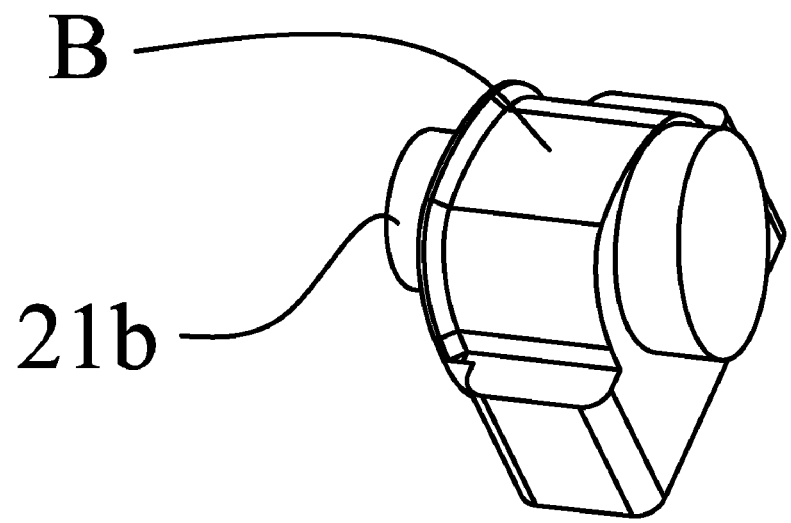
FIG. 6 is a perspective view of an inserting part B in FIG. 3.
Figure 7:
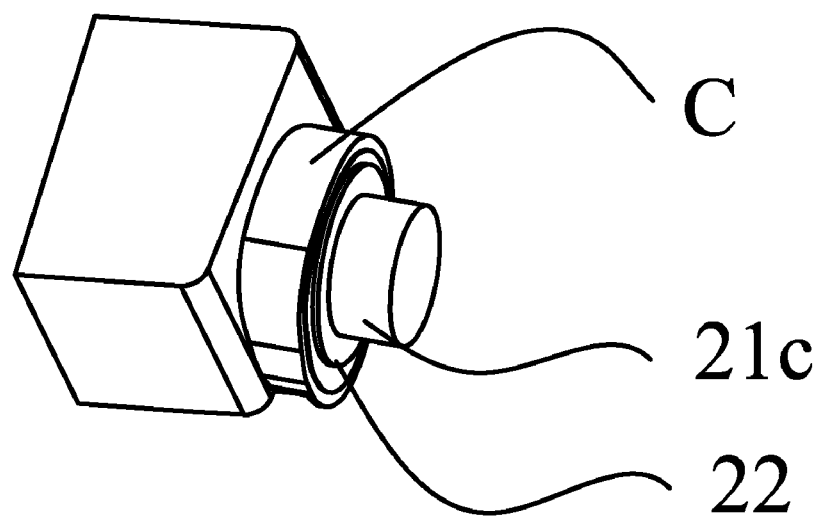
FIG. 7 is a perspective view of an inserting part C in FIG. 3.

As connecting devices 6 and 7 are to be installed on the connecting surface, a cavity is integrally formed to prevent secondary processing. As shown in FIGS. 3, 5 and 7, a neck and shoulders of the mannequin are respectively connected to a head and two arms thereof.

Multiple protruding parts 21a, 21b and 21c are respectively disposed on a molding surface of the inserting parts A, B and C. Taking the inserting part C for example, to integrally form a cavity 17 on a connecting part between the shoulder and the arm, the protruding part 21c is disposed on the molding surface in the front of the inserting part C, and a height of the protruding part 21c is 23 mm.

Meanwhile, to prevent dimension errors of the blow mold product and to facilitate convenient assembling of the connecting device 7, a step 22 is disposed at the root of the protruding part 21c. A height of the step 22 is 2-3 mm.

The protruding part 21c is disposed on the inserting part C, or connected to the inserting part C by welding or close fit, or via a screw. The back of the inserting part C is connected to a piston shaft 41 of an air cylinder or a hydraulic cylinder 8. A body of the air cylinder or the hydraulic cylinder 8 is disposed on a mold 5 or other components.

The inserting part C reciprocally moves under the action of the piston shaft 41.

The gap 3 is disposed between the model cavity 1 and the inserting part C and operates to discharge air. A width of the gap 3 is normally 0.5-2.5 mm. Preferably, a width of the gap 3 is 1.5 mm.

Figure 15:
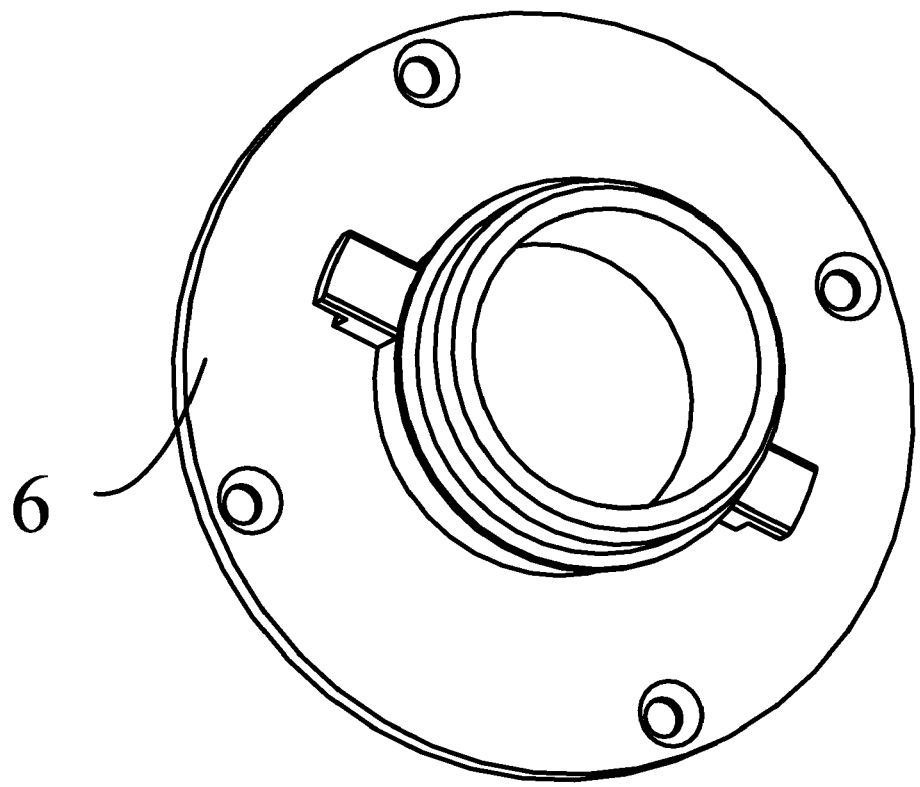
FIG. 15 is a perspective view of a connecting device of a mannequin made by a blow mold of the invention.
Figure 16:
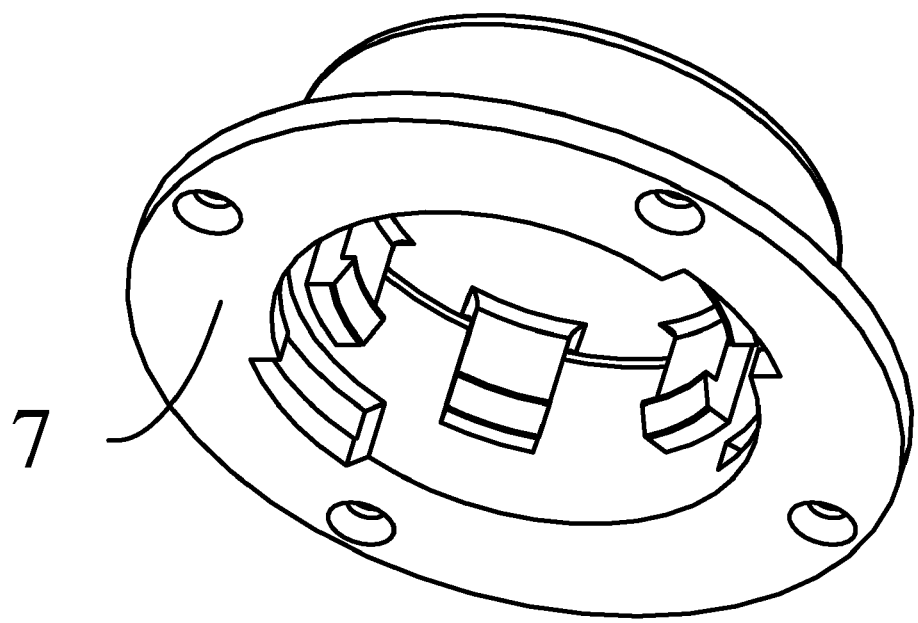
FIG. 16 is a perspective view of another connecting device fit with a connecting device in FIG. 15.

Before blow molding, the inserting part C move forwards so that the molding surface in the front of the inserting part C is aligned with the profile in the model cavity 1. After blow molding, the inserting part C moves backwards under the action of the piston shaft 41, and a moving distance thereof is greater than (or at least equal to) a height of the protruding part 21c thereon. Therefore, after the blow molding process is completed, a cavity 17 and a connecting surface 16 are formed at the inserting part C, and the cavity 17 operates to receive the connecting devices 6 and 7 (as shown in FIG. 15 or 16), and smoothness of the connecting plane 16 can be ensured.

Figure 8:
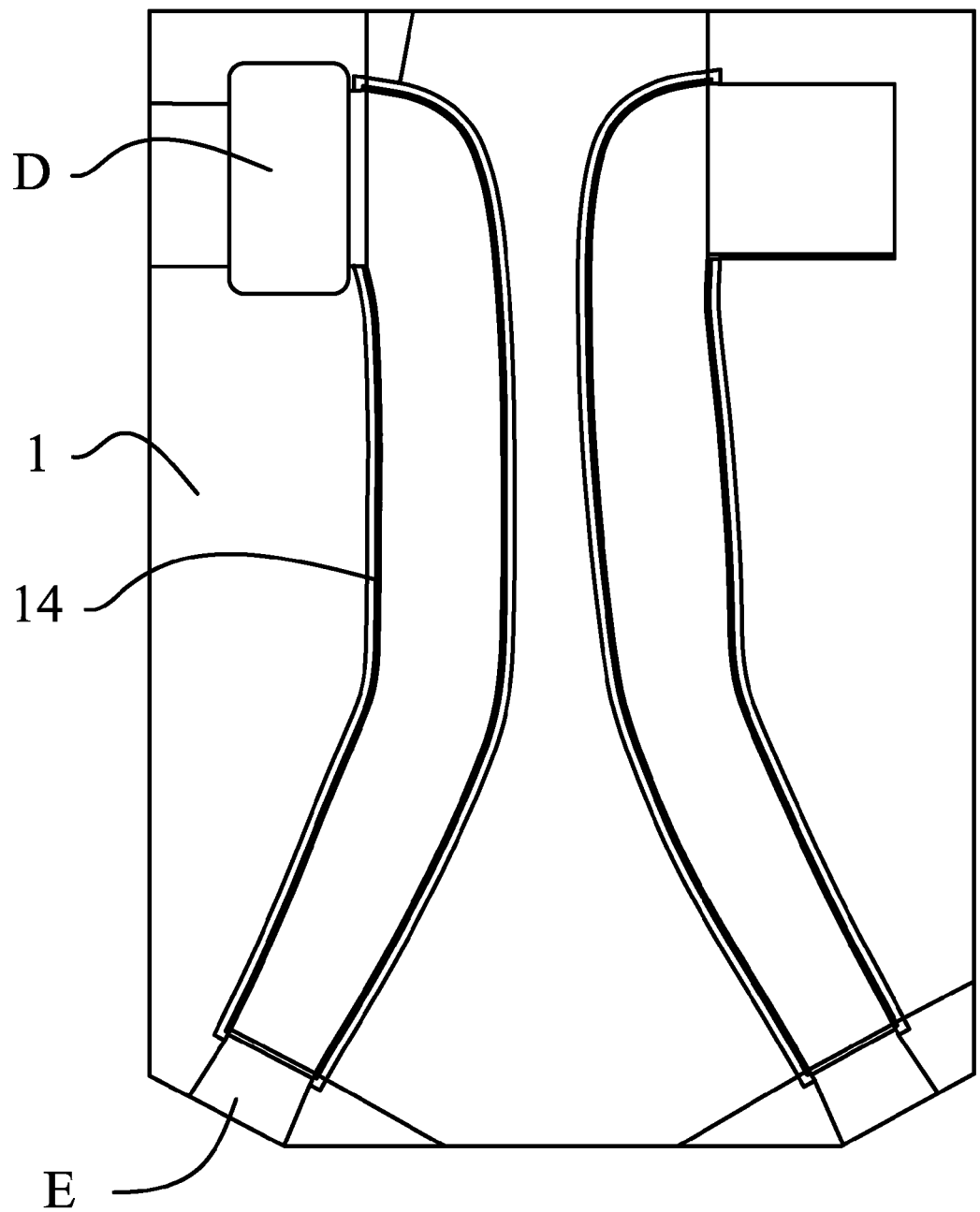
FIG. 8 is a schematic view of a blow mold for an arm of a mannequin of an exemplary embodiment of the invention.
Figure 9:
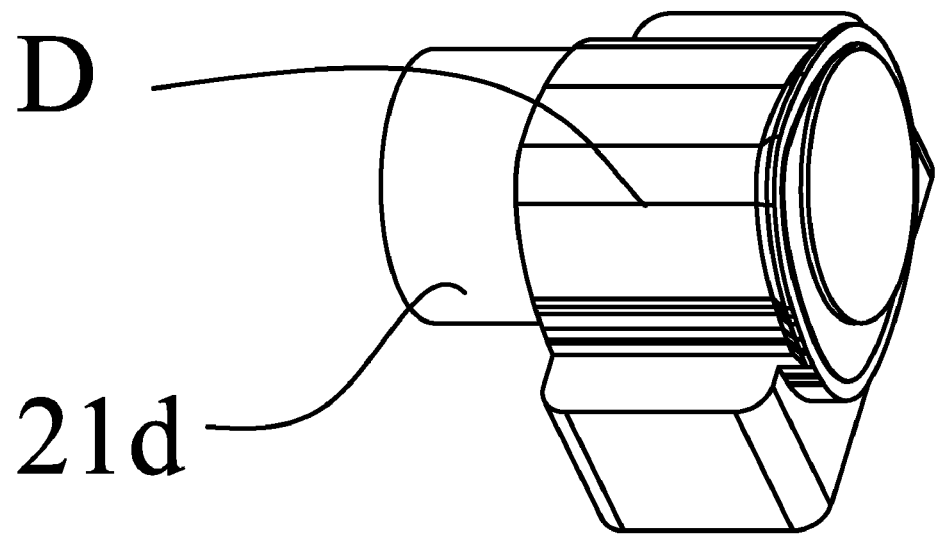
FIG. 9 is a perspective view of an inserting part D in FIG. 8.
Figure 10:
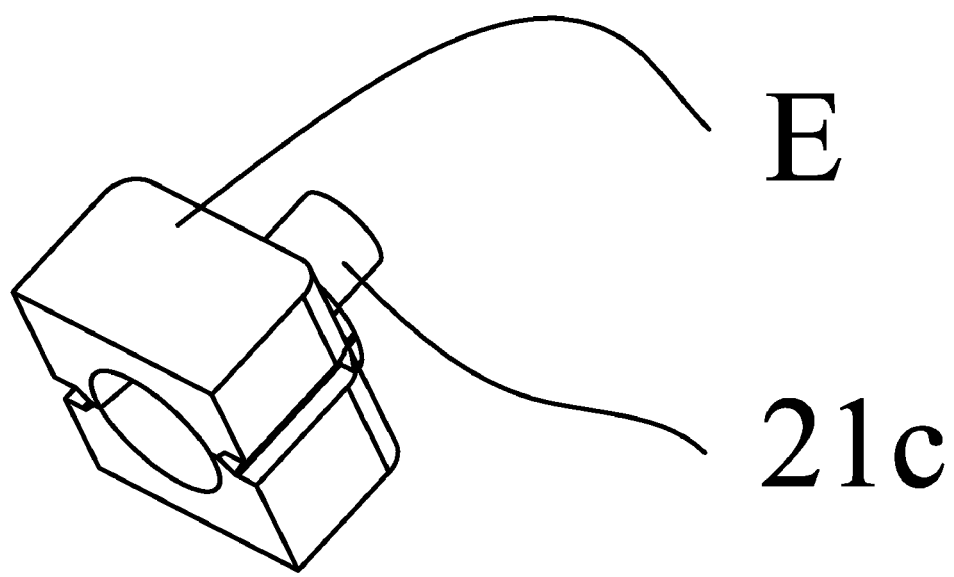
FIG. 10 is a perspective view of an inserting part E in FIG. 8.

As shown in FIGS. 8-10, protruding parts 21d and 21e are respectively disposed on a molding surface of the inserting parts D and E, and a cavity corresponding thereto is integrally formed.

Figure 11:
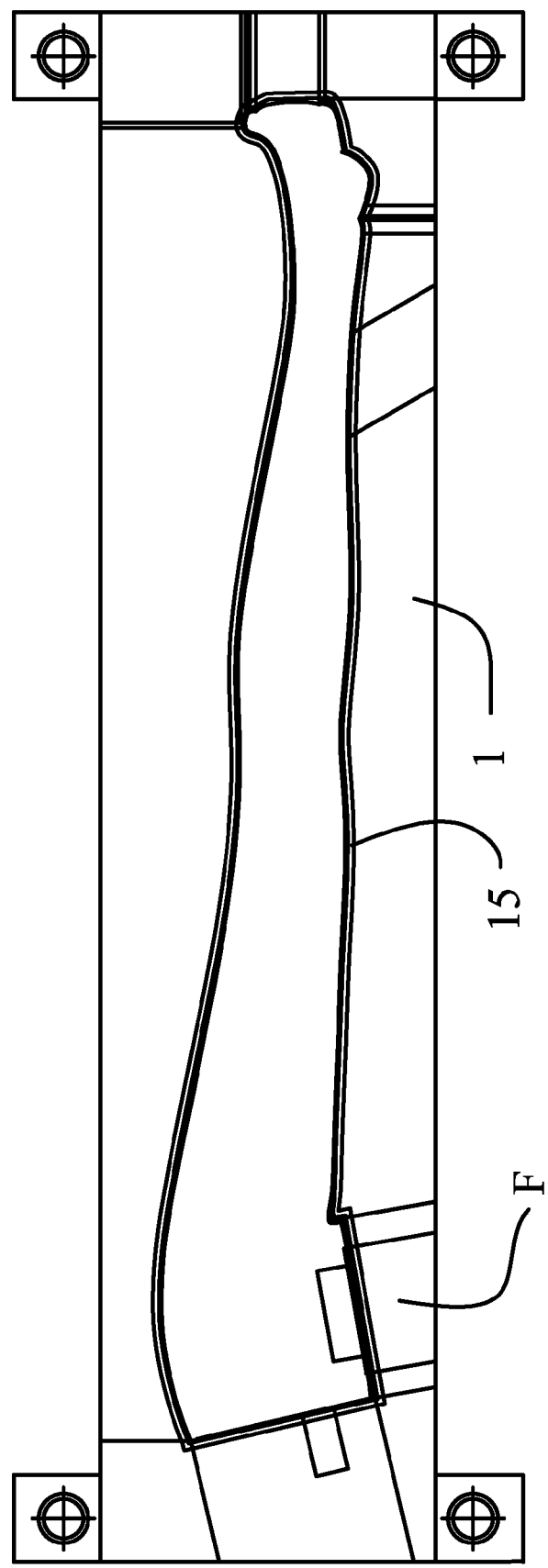
FIG. 11 is a schematic view of a blow mold for a lower limb of a mannequin of an exemplary embodiment of the invention.
Figure 12:
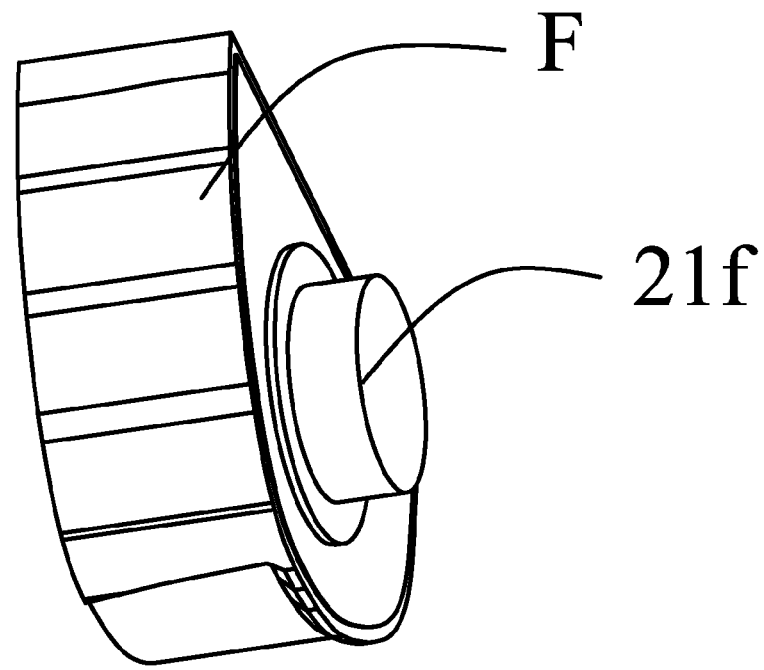
FIG. 12 is a perspective view of an inserting part F in FIG. 11.
Figure 13:
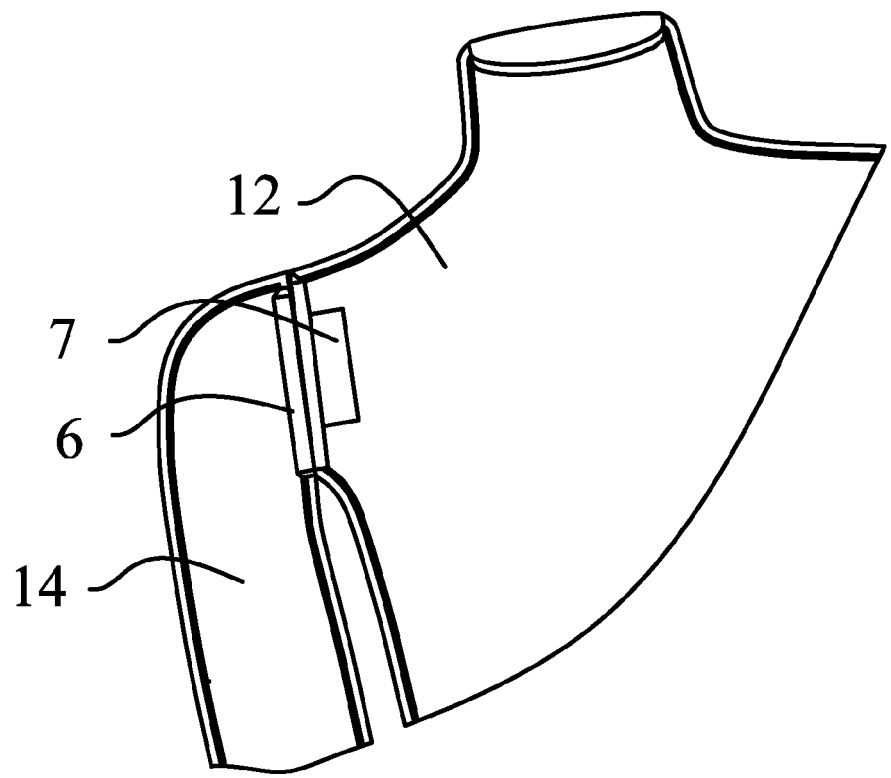
FIG. 13 is a schematic view of a mannequin made by a blow mold of the invention.
Figure 14:
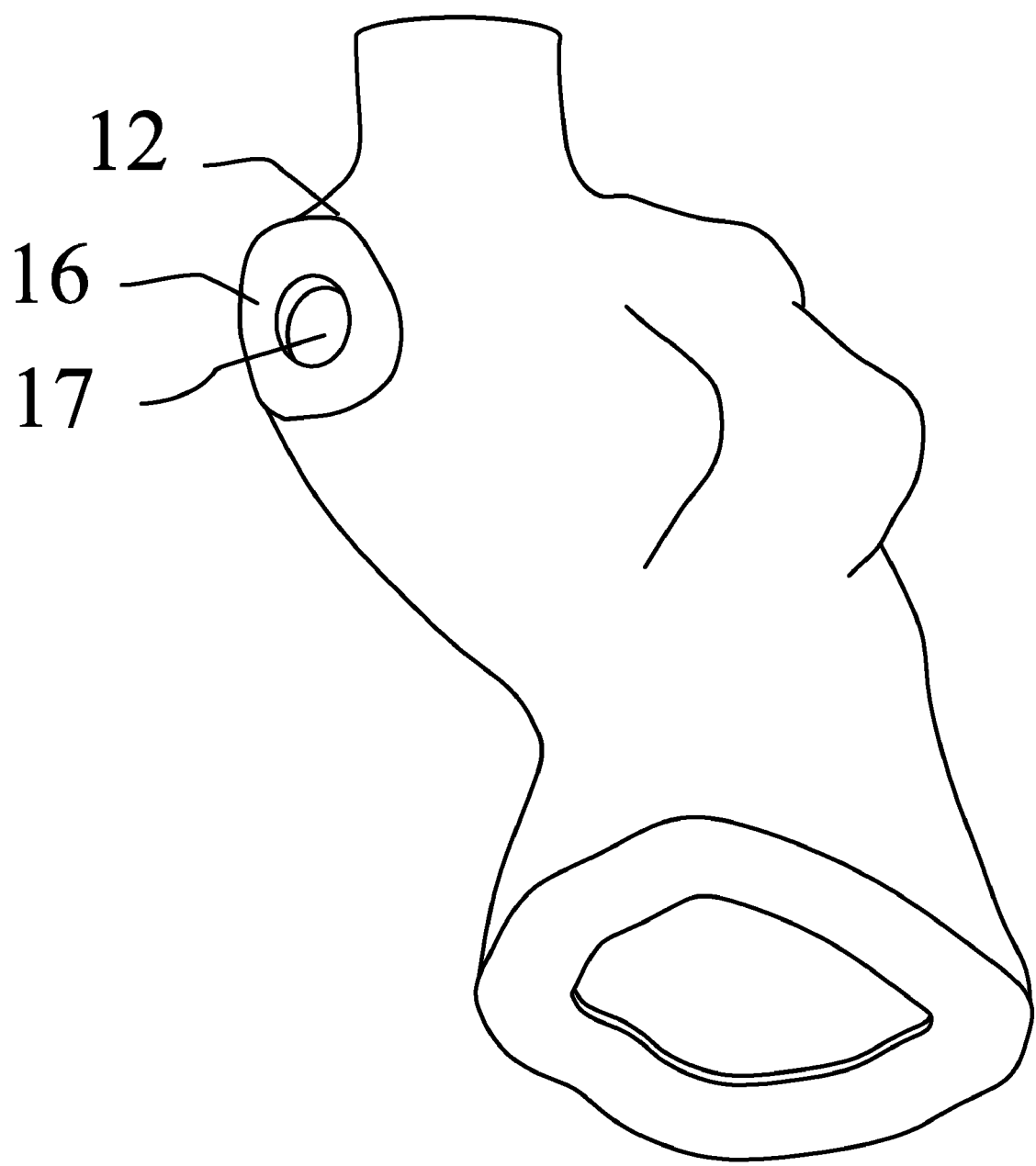
FIG. 14 is a perspective view of a trunk of a mannequin made by a blow mold of the invention.

As shown in FIGS. 11 and 12, an inserting part F operates to mold a connecting surface of a side of a lower limb of a mannequin.

It should be noted that connecting surfaces of two lower limbs of the mannequin are opposite to the center of the lower limb (namely a boundary of a hip), which moves a connecting line between adjacent components to a hiding position, and thus improving exhibition effect of a mannequin wearing tights, socks or pants, and preventing a concave part from appearing thereon. In addition, this structure makes it convenient to take on or off trousers.

As shown in FIGS. 15 and 16, a surface of one lower limb 15 is disposed in the model cavity 1, a connecting surface between two lower limbs 15 is disposed on an inserting part F. A protruding part 21f is disposed on the inserting part F. The inserting part F is disposed in the model cavity 1. The back of the inserting part F is connected to a piston shaft of an air cylinder or a hydraulic cylinder (not shown). A gap is disposed between the inserting part F and the model cavity 1. Under the action of compressed air, parison is molded along the model cavity 1, and fills the surface between the model cavity 1 and the inserting part F, and thus a thigh of the mannequin having a right angle or an approximate right angle at the connecting part is molded.

Since the lower limbs are connected to the connecting devices 6 and 7, they are capable of rotating for a certain angle, which makes it convenient to adjust exhibition posture of the mannequin.

Alternatively, the inserting part is fixed on the model cavity 1, the protruding part in the front of the inserting part is flexibly connected to the inserting part, and a gap is disposed therebetween to ensure air venting and relative movement. The other end of the protruding part is directly or indirectly connected to a piston shaft of an air cylinder or a hydraulic cylinder to facilitate reciprocal movement. Before blow molding, the protruding part move forwards to a position and is fixed. After blow molding, the protruding part moves backwards under the action of the piston shaft, and a moving distance thereof is greater than (or at least equal to) a height of the protruding part. Therefore, after the blow molding process is completed, a cavity is formed at the protruding part, and operates to receive the connecting devices 6 and 7.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A blow mold for a mannequin, comprising
a model cavity having a profile;
an inserting part; and
a drive device;
wherein
said inserting part is disposed on said model cavity;
a modeling surface is disposed in the front of said inserting part, and operates to form a part of said profile of said model cavity;
an angle between said molding surface of said inserting part and said profile of said model cavity is 90 degrees;
a gap is disposed between said model cavity and said inserting part;
a protruding portion is disposed on said molding surface of said inserting part and faces towards the inside of said model cavity;
said inserting part is connected to said drive device;
said drive device operates to drive said inserting part to move towards said model cavity before blow molding, and to reset said inserting part after blow molding; and
said protruding part is flexibly connected to said inserting part.

2. The blow mold of claim 1, wherein said protruding part is disposed on said inserting part.

3. The blow mold of claim 1, wherein said protruding part is fixedly connected to said inserting part.

4. The blow mold of claim 1, wherein
said drive device is an air cylinder or a hydraulic cylinder;
a body of said drive device is disposed on a mold; and
an axis of said drive device is connected to said inserting part.

5. The blow mold of claim 1, wherein a width of said gap is 0.5-2.5 millimeters.

6. The blow mold of claim 1, wherein a height of said protruding part is 4-30 mm.

7. The blow mold of claim 1, further comprising a concave part disposed on said inserting part.

8. The blow mold of claim 7, further comprising a connecting device received in said concave part and connected to a lower limb of the mannequin.

9. A blow mold for a mannequin, comprising
a model cavity having a profile;
an inserting part; and
a drive device;
wherein
said inserting part is disposed on said model cavity;
a modeling surface is disposed in the front of said inserting part, and operates to form a part of said profile of said model cavity;
an angle between said molding surface of said inserting part and said profile of said model cavity is 90 degrees;
a gap is disposed between said model cavity and said inserting part;
a protruding portion is disposed on said molding surface of said inserting part and faces towards the inside of said model cavity;
said protruding part is connected to said drive device;
said drive device operates to drive said protruding part to move towards said model cavity before blow molding, and to reset said protruding part after blow molding;
a height of said protruding part is less than or equal to a moving distance of said protruding part under the action of said drive device; and
said protruding part is flexibly connected to said inserting part.

10. The blow mold of claim 9, wherein said protruding part is disposed on said inserting part.

11. The blow mold of claim 9, wherein said protruding part is fixedly connected to said inserting part.

12. The blow mold of claim 9, wherein
said drive device is an air cylinder or a hydraulic cylinder;
a body of said drive device is disposed on a mold; and
an axis of said drive device is connected to said protruding part.

13. The blow mold of claim 9, wherein a width of said gap is 0.5-2.5 millimeters.

14. The blow mold of claim 9, wherein a height of said protruding part is 4-30 mm.

15. The blow mold of claim 9, further comprising a concave part disposed on said inserting part.

16. The blow mold of claim 15, further comprising a connecting device received in said concave part and connected to a lower limb of the mannequin.

* * * * *